United States Patent
Yamashita et al.

(10) Patent No.: US 9,206,876 B2
(45) Date of Patent: Dec. 8, 2015

(54) DAMPING FORCE CONTROL TYPE SHOCK ABSORBER

(71) Applicant: HITACHI AUTOMOTIVE SYSTEMS, LTD., Ibaraki (JP)

(72) Inventors: Mikio Yamashita, Zama (JP); Shunsuke Mori, Yokohama (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 4 days.

(21) Appl. No.: 14/224,768

(22) Filed: Mar. 25, 2014

(65) Prior Publication Data

US 2014/0353099 A1    Dec. 4, 2014

(30) Foreign Application Priority Data

May 30, 2013 (JP) .................. 2013-114107
Dec. 24, 2013 (JP) .................. 2013-265788

(51) Int. Cl.
*F16F 9/34* (2006.01)
*F16F 9/512* (2006.01)
*F16F 9/348* (2006.01)
*F16F 9/06* (2006.01)

(52) U.S. Cl.
CPC . *F16F 9/512* (2013.01); *F16F 9/34* (2013.01); *F16F 9/348* (2013.01); *F16F 9/062* (2013.01)

(58) Field of Classification Search
CPC ......... F16F 9/062; F16F 9/325; F16F 9/3257; F16F 9/348; F16F 9/3482; F16F 9/3488; F16F 9/464

See application file for complete search history.

(56) References Cited

U.S. PATENT DOCUMENTS

| | | | |
|---|---|---|---|
| 8,413,774 B2 * | 4/2013 | Murakami | 188/322.13 |
| 2007/0000743 A1 * | 1/2007 | Naitou et al. | 188/322.2 |
| 2014/0339032 A1 * | 11/2014 | Yamasaki et al. | 188/297 |

FOREIGN PATENT DOCUMENTS

JP  2009-281584  12/2009

* cited by examiner

*Primary Examiner* — Anna Momper
(74) *Attorney, Agent, or Firm* — Wenderoth, Lind & Ponack, L.L.P.

(57) ABSTRACT

For the extension and compression strokes of a piston rod, a damping force generating mechanism generates a damping force by controlling the flow of hydraulic oil caused by the sliding movement of a piston in a cylinder. The damping force generating mechanism has a pilot-type main valve, a pilot-type control valve, and a pilot valve. The main valve has a pilot chamber into which the oil is introduced to adjust the valve-opening pressure of the main valve by the pressure in the pilot chamber. The control valve has a pilot chamber into which the oil is introduced to adjust the valve-opening pressure of the control valve by the pressure in the pilot chamber. The pilot valve controls the pressure in the pilot chamber of the control valve. The control valve controls the pressure in the pilot chamber of the main valve.

12 Claims, 8 Drawing Sheets

DAMPING FORCE CONTROL TYPE SHOCK ABSORBER

BACKGROUND OF THE INVENTION

The present invention relates to a damping force control type shock absorber generating a damping force against the stroke of a piston rod by controlling the flow of a fluid and capable of adjusting the damping force.

In general, a shock absorber attached to a suspension system of an automobile or other vehicle has a cylinder having a fluid sealed therein, a piston slidably fitted in the cylinder and connected with a piston rod, and a damping force generating mechanism comprising an orifice, a disk valve, etc. In response to a stroke of the piston rod, the piston slidingly moves in the cylinder, causing a flow of fluid. The flow of fluid is controlled by the damping force generating mechanism, thereby generating a damping force.

In a hydraulic shock absorber disclosed in Japanese Patent Laid-Open Publication No. 2009-281584, for example, a back-pressure chamber (pilot chamber) is formed at the back of a main disk valve constituting a damping force generating mechanism. A fluid is introduced into the back-pressure chamber to apply the pressure in the back-pressure chamber to the main disk valve in the direction for closing the valve. The pressure in the back-pressure chamber is adjusted by a solenoid valve (pilot valve), thereby controlling the valve-opening operation of the main disk valve. With this structure, it is possible to increase the degree of freedom for adjusting damping force characteristics.

Regarding the above-described damping force control type shock absorber, there is a demand for reduction in size of the solenoid valve in order to reduce power consumption, manufacturing cost, and so forth. However, a mere reduction in size of the solenoid valve limits the controllable fluid flow rate and pressure, resulting in a narrowed damping force controllable range, which makes it difficult to obtain desired damping force characteristics.

SUMMARY OF INVENTION

The present invention has been made in view of the above-described circumstances. Accordingly, an object of the present invention is to provide a damping force control type shock absorber capable of reducing the size of the solenoid valve while maintaining a necessary damping force characteristic controllable range.

To solve the above-described problem, the present invention provides a damping force control type shock absorber including a cylinder having a hydraulic fluid sealed therein, a piston slidably fitted in the cylinder, a piston rod connected to the piston and extended to the outside of the cylinder, and a damping force generating mechanism which can generate a damping force by controlling a flow of hydraulic fluid caused or induced by sliding movement of the piston in the cylinder. The damping force generating mechanism includes a pilot-type main valve that opens upon receiving the pressure of the hydraulic fluid to generate a damping force. The main valve has a pilot chamber into which the hydraulic fluid is introduced to adjust the valve-opening pressure of the main valve by the pressure in the pilot chamber. The damping force generating mechanism further includes a pilot-type control valve which can control the pressure in the pilot chamber of the main valve, and a solenoid valve which can control the pressure in a pilot chamber of the control valve.

DESCRIPTION OF EMBODIMENTS

An embodiment of the present invention will be explained below in detail with reference to the accompanying drawings.

Figure 1:
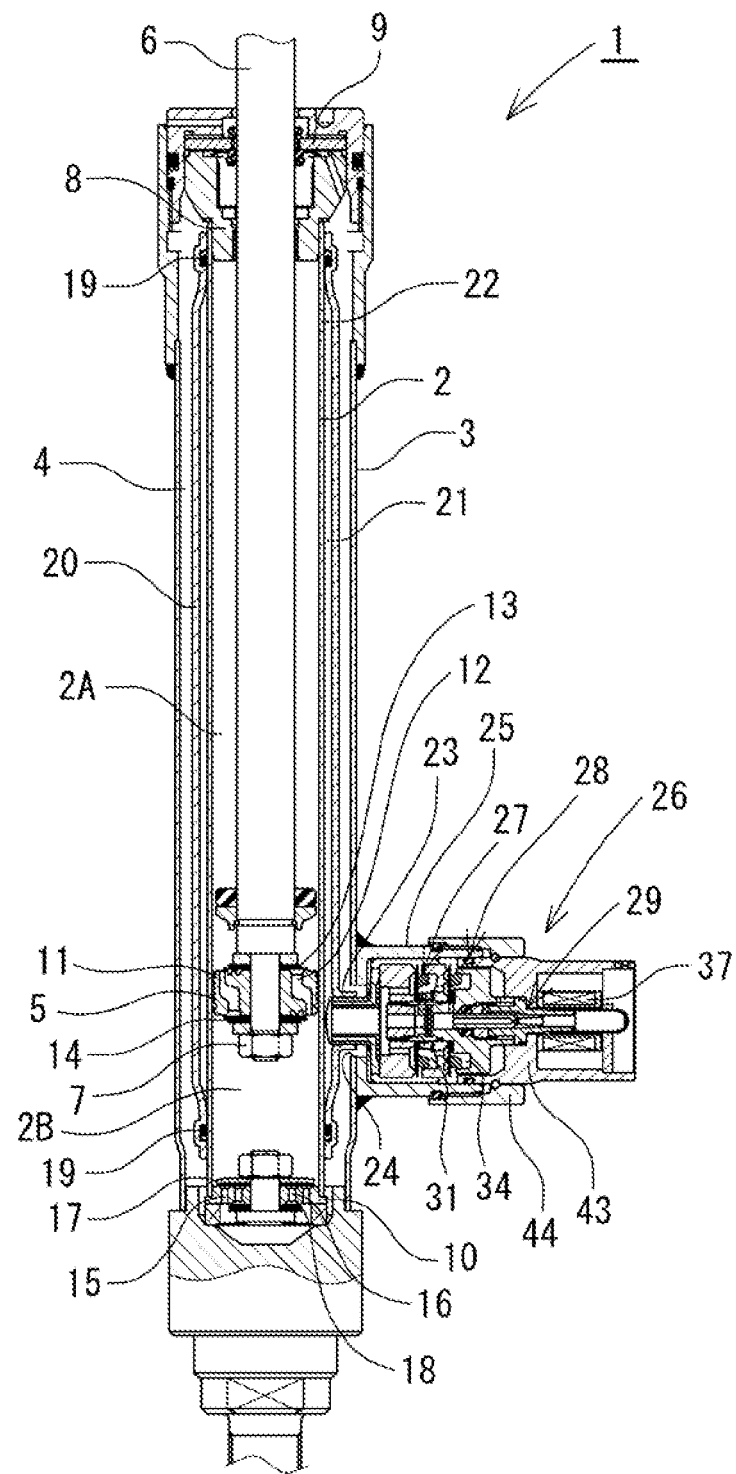
FIG. 1 is a vertical sectional view of a damping force control type shock absorber according to a first embodiment of the present invention.

As shown in FIG. 1, a damping force control type shock absorber 1 according to this embodiment has a dual-tube structure comprising a cylinder 2 and an outer tube 3 provided around the outer periphery of the cylinder 2. A reservoir 4 is formed between the cylinder 2 and the outer tube 3. The cylinder 2 has a piston 5 slidably fitted therein. The piston 5 divides the interior of the cylinder 2 to define two chambers, i.e. a cylinder upper chamber 2A and a cylinder lower chamber 2B. One end of a piston rod 6 is connected to the piston 5 with a nut 7. The other end of the piston rod 6 extends through the cylinder upper chamber 2A and further extends to the outside of the cylinder 2 through a rod guide 8 and an oil seal 9, which are fitted to the upper end portion of the dual-tube structure comprising the cylinder 2 and the outer tube 3. The lower end portion of the cylinder 2 is provided with a base valve 10 dividing the cylinder lower chamber 2B and the reservoir 4 from each other.

The piston 5 is provided with passages 11 and 12 communicating between the cylinder upper and lower chambers 2A and 2B. The passage 12 is provided with a check valve 13 allowing only a flow of fluid from the cylinder lower chamber 2B toward the cylinder upper chamber 2A. The set load of the check valve 13 is so small that the check valve 13 opens the moment that the stroke of the piston rod 6 changes from the extension stroke to the compression stroke. The passage 11 is provided with a disk valve 14 that opens when the fluid pressure in the cylinder upper chamber 2A reaches a predetermined pressure during the extension stroke to relieve the fluid pressure in the cylinder upper chamber 2A to the cylinder lower chamber 2B. The valve-opening pressure of the disk valve 14 is set very high so that the disk valve 14 does not open during running on an ordinary road surface. The disk valve 14 is provided with an orifice 14A (see FIG. 3) constantly connecting between the cylinder upper and lower chambers 2A and 2B.

The base valve 10 is provided with passages 15 and 16 communicating between the cylinder lower chamber 2B and the reservoir 4. The passage 15 is provided with a check valve 17 allowing only a flow of fluid from the reservoir 4 toward the cylinder lower chamber 2B. The set load of the check valve 17 is so small that the check valve 17 opens the moment that the stroke of the piston rod 6 changes from the compression stroke to the extension stroke. The passage 16 is provided with a disk valve 18 that opens when the fluid pressure in the cylinder lower chamber 2B reaches a predetermined pressure to relieve the fluid pressure in the cylinder lower chamber 2B to the reservoir 4. The valve-opening pressure of the disk valve 18 is set very high so that the disk valve 18 does not open during running on an ordinary road surface. The disk valve 18 is provided with an orifice 18A (see FIG. 3) constantly connecting between the cylinder lower chamber 2B and the reservoir 4. As hydraulic fluid, hydraulic oil is sealed in the cylinder 2, and the hydraulic oil and gas are sealingly contained in the reservoir 4.

The cylinder 2 has a separator tube 20 fitted thereover with seal members 19 interposed therebetween at the upper and lower ends of the cylinder 2. Thus, an annular passage 21 is formed between the cylinder 2 and the separator tube 20. The annular passage 21 is communicated with the cylinder upper chamber 2A through a passage 22 provided in a side wall of the cylinder 2 near the upper end thereof. It should be noted that there may be provided a plurality of circumferentially spaced passages 22 according to the specifications. The separator tube 20 has a circular cylindrical connecting opening 23 projecting sideward from a lower end part thereof. The side wall of the outer tube 3 is provided with an opening 24 in concentric relation to the connecting opening 23. The opening 24 is larger in diameter than the connecting opening 23. A circular cylindrical casing 25 is joined by welding or the like to the side wall of the outer tube 3 in such a manner as to surround the opening 24. A damping force generating mechanism 26 is installed in the casing 25.

Figure 2:
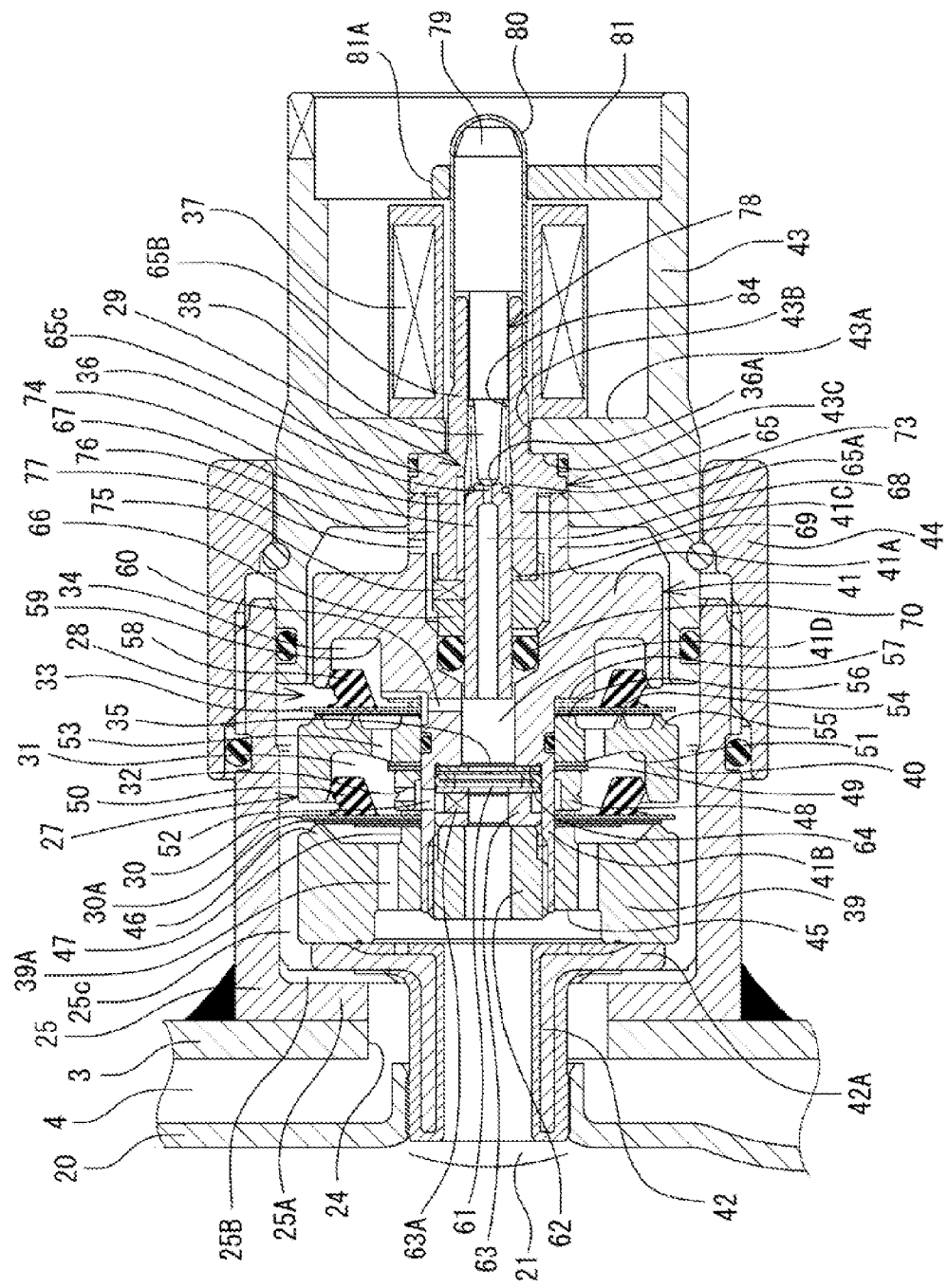
FIG. 2 is an enlarged vertical sectional view of a damping force generating mechanism as an important part of the damping force control type shock absorber shown in FIG. 1.
Figure 3:
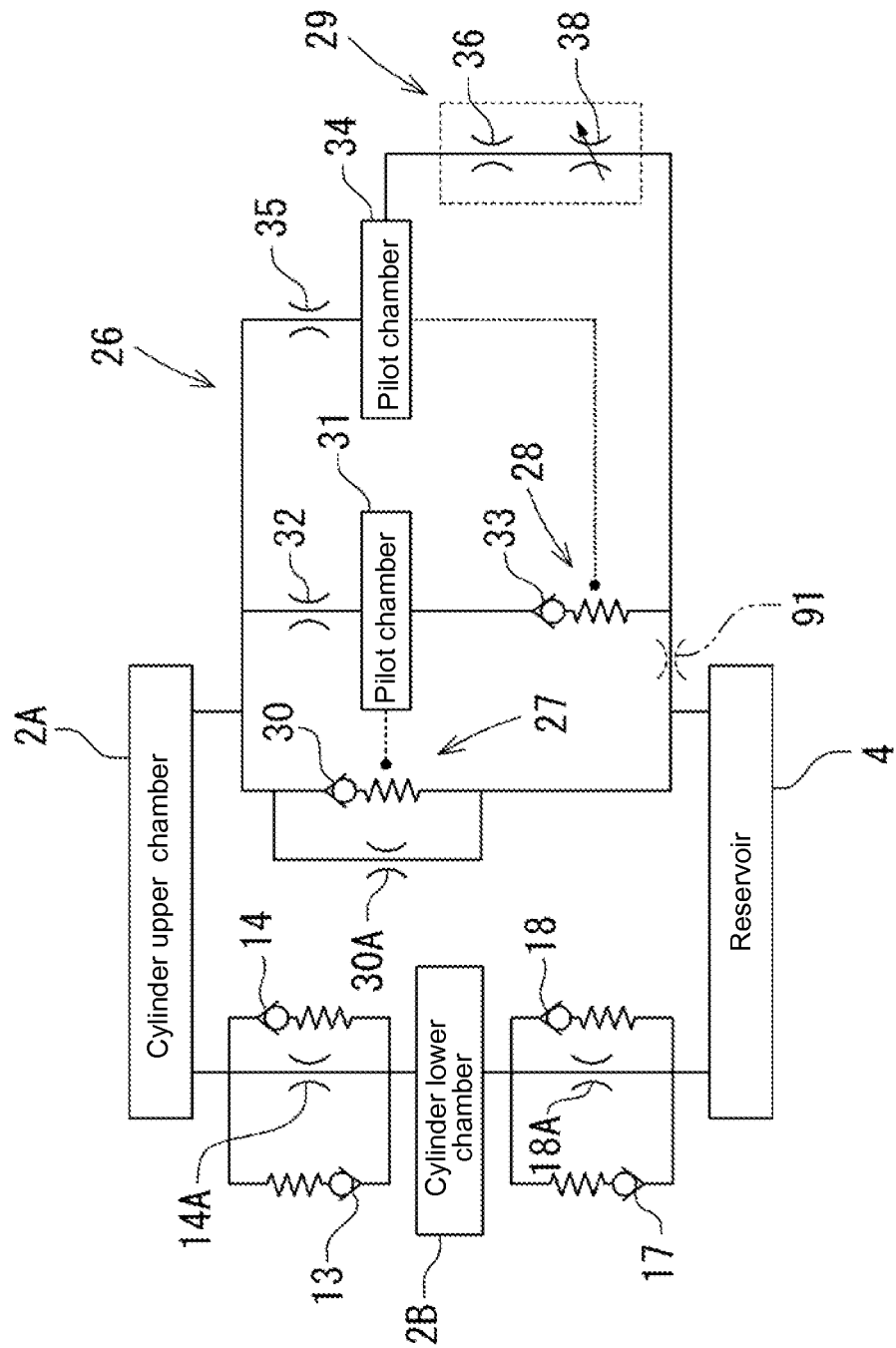
FIG. 3 is a hydraulic circuit diagram of the damping force control type shock absorber shown in FIG. 1.

Next, the damping force generating mechanism 26 will be explained with reference mainly to FIGS. 2 and 3.

The damping force generating mechanism 26 has a pilot-type main valve 27, a pilot-type control valve 28, and a pilot valve 29 which is a solenoid-driven pressure control valve.

The main valve 27 has a disk valve 30 that opens upon receiving the pressure of fluid in the cylinder upper chamber 2A to allow the fluid to flow toward the reservoir 4. The main valve 27 further has a pilot chamber 31 that applies the pressure therein to the disk valve 30 in the direction for closing the disk valve 30. The pilot chamber 31 is connected to the cylinder upper chamber 2A through a fixed orifice 32 and also connected to the reservoir 4 through the control valve 28. The disk valve 30 is provided with an orifice 30A constantly connecting between the cylinder upper chamber 2A and the reservoir 4.

The control valve 28 has a disk valve 33 that opens upon receiving the pressure of fluid in the pilot chamber 31 to allow the fluid to flow toward the reservoir 4. The control valve 28 further has a pilot chamber 34 that applies the pressure therein to the disk valve 33 in the direction for closing the disk valve 33. The pilot chamber 34 is connected to the cylinder upper chamber 2A through a fixed orifice 35 and also connected to the reservoir 4 through the pilot valve 29.

The pilot valve 29 adjusts the pressure in the pilot chamber 34 of the control valve 28 by narrowing the flow path with a small-diameter port 36 and selectively opening and closing the port 36 with a valve element 38 driven by a solenoid 37. It should be noted that the port 36 is reduced in diameter to reduce the pressure-receiving area of the valve element 38, thereby making it possible to increase the pressure obtained when the pilot valve 29 is closed with the maximum electric current flowing through the solenoid 37. Consequently, it is possible to increase the differential pressure determined by the magnitude of the electric current, and hence possible to increase the variable width of damping force characteristics.

Next, a specific structure of the damping force generating mechanism 26 will be explained in more detail with reference mainly to FIG. 2.

The damping force generating mechanism 26 has a casing 25. In the casing 25, a main body 39, a control body 40, and a pilot body 41 are disposed, together with a passage member 42. The main body 39 incorporates the main valve 27, the control valve 28, and the pilot valve 29. A solenoid case 43 is secured to an opening end of the casing 25 by a nut 44. Thus, the interior of the casing 25 is sealed, and the above-described members, i.e. the main valve 27, the control valve 28, and the pilot valve 29, are secured to the casing 25. The solenoid case 43 is in the shape of a substantially circular cylinder, the interior of which is axially divided by an intermediate wall 43A. One end of the solenoid case 43 is inserted and fitted in the casing 25. The other end of the solenoid case 43 projects out of the casing 25. In this state, the solenoid case 43 is secured to the casing 25 by the nut 44. The intermediate wall 43A has an opening 43B extending through the center thereof and further has an annular recess 43C formed around one end of the opening 43B.

The passage member 42 is a circular cylindrical member having a flange portion 42A around the outer periphery of one end thereof. The flange portion 42A abuts against an inward flange portion 25A of the casing 25, and the cylindrical portion of the passage member 42 is liquid-tightly inserted into the connecting opening 23 of the separator tube 20. In this way, the passage member 42 is connected to the annular passage 21. The inward flange portion 25A of the casing 25 has a plurality of radially extending passage grooves 25B. The reservoir 4 and a chamber 25C in the casing 25 are communicated with each other through the passage grooves 25B and the opening 24 of the outer tube 3.

The main body 39 and the control body 40 are annular members. The pilot body 41 is in the shape of a stepped circular cylinder having a large-diameter portion 41A in the middle thereof. A circular cylindrical portion 41B at one end of the pilot body 41 is inserted into the main body 39 and the control body 40. Further, a circular cylindrical portion 41C at the other end of the pilot body 41 is fitted into the recess 43C of the intermediate wall 43A of the solenoid case 43. Thus, the main body 39, the control body 40, the pilot body 41, and the solenoid case 43 are concentrically positioned with respect to each other.

The main body 39 is provided with a plurality of circumferentially spaced passages 39A axially extending therethrough. The passages 39A communicate with the passage member 42 through an annular recess 45 formed at one end of the main body 39. The other end of the main body 39 has an annular seat portion 46 projecting at the outer peripheral side of the openings of the circumferentially spaced passages 39A and further has an annular clamp portion 47 projecting at the inner peripheral side of the openings of the passages 39A. The disk valve 30, which constitutes the main valve 27, is seated at an outer peripheral portion thereof on the seat portion 46 of the main body 39. The inner peripheral portion of the disk valve 30 is clamped, together with an annular retainer 48 and a washer 49, between the clamp portion 47 and the control body 40. The disk valve 30 has an annular elastic seal member 50 fixed to the outer peripheral portion of the rear side thereof. The elastic seal member 50 is made of an elastic material, e.g. rubber, and fixed to the disk valve 30 by vulcanizing bonding or the like. The disk valve 30 comprises flexible or pliable disk-shaped valve elements stacked appropriately so that desired flexibility characteristics can be obtained. The disk valve 30 has a notch formed on the outer peripheral portion thereof. The notch constitutes an orifice 30A constantly communicating between the passages 39A and the chamber 25C in the casing 25.

The control body 40 has an annular recess 51 formed at one end thereof. The outer peripheral portion of the elastic seal member 50 fixed to the disk valve 30 is slidably and liquid-tightly fitted in the recess 51 to form a pilot chamber 31 in the recess 51. The disk valve 30 lifts from the seat portion 46 to open upon receiving the pressure in the passage 39A, thereby allowing the passages 39A to communicate with the chamber 25C in the casing 25. The pressure in the pilot chamber 31 acts on the disk valve 30 in the direction for closing the disk valve 30. The pilot chamber 31 communicates with the interior of the cylindrical portion 41B through a fixed orifice 32 provided in the side wall of the retainer 48 and through a passage 52 provided in the side wall of the cylindrical portion 41B of the pilot body 41 and further communicates with the passage member 42. The bottom of the control body 40, which forms the annular recess 51, is formed so that the thickness thereof increases with the distance toward the center thereof, i.e. toward the pilot body 41. The reason for this is as follows. The portion of the bottom of the control body 40 that is closer to the center thereof, i.e. closer to the pilot body 41, needs to be rigid because an axial force is applied thereto. Therefore, the necessary thickness is ensured for the bottom of the control body 40. The portion of the bottom of the control body 40 closer to the outer periphery thereof is formed thinner than the portion of the bottom of the control body 40 closer to the center thereof in order to ensure the necessary volume for the pilot chamber 31.

The control body 40 is provided with a plurality of circumferentially spaced passages 53 axially extending therethrough to communicate at one end thereof with the pilot chamber 31. The other end of the control body 40 has an annular inner seat portion 54 projecting at the outer peripheral side of the openings of the circumferentially spaced passages 53. Further, the other end of the control body 40 is provided with an outer seat portion 55 projecting at the outer peripheral side of the inner seat portion 54. In addition, the other end of the control body 40 has an annular clamp portion 56 projecting at the inner peripheral side of the circumferentially spaced passages 53. A disk valve 33 constituting the control valve 28 is seated on the inner and outer seat portions 54 and 55. The inner peripheral portion of the disk valve 33 is clamped, together with a washer 57, between the clamp portion 56 and the large-diameter portion 41A of the pilot body 41. The disk valve 33 has an annular elastic seal member 58 fixed to the outer peripheral portion of the rear side thereof. The elastic seal member 58 is made of an elastic material, e.g. rubber, and fixed to the disk valve 33 by vulcanizing bonding or the like The disk valve 33 comprises flexible or pliable disk-shaped valve elements stacked appropriately so that desired flexibility characteristics can be obtained.

The large-diameter portion 41A of the pilot body 41 has an annular recess 59 formed at one end thereof. The outer peripheral portion of the elastic seal member 58 fixed to the disk valve 33 is slidably and liquid-tightly fitted in the annular recess 59 to form a pilot chamber 34 in the recess 59. The disk valve 33 lifts sequentially from the outer and inner seat portions 55 and 54 to open upon receiving the pressure in the passages 53, which communicate with the pilot chamber 31 of the main valve 27, thereby allowing the passages 53 to communicate with the chamber 25C in the casing 25. The pressure in the pilot chamber 34 acts on the disk valve 33 in the direction for closing the disk valve 33. The pilot chamber 34 communicates with a passage 41D in the cylindrical portion 41B through a passage 60 provided in the side wall of the pilot body 41 and further communicates with the interior of the passage member 42 through a fixed orifice 35 and a filter 61, which are provided in the cylindrical portion 41B. The fixed orifice 35 and the filter 61 are secured to a step portion 64 in the cylindrical portion 41B by a circular cylindrical retainer 62 and spacer 63 screwed into the distal end of the cylindrical portion 41B of the pilot body 41. The side wall of the spacer 63 is provided with a notch 63A for allowing the fixed orifice 35 to communicate with the passage 41D in the cylindrical portion 41B.

A guide member 65 is inserted into the cylindrical portion 41C at the other end of the pilot body 41 and through the opening 43B and recess 43C of the solenoid case 43. The guide member 65 is formed in the shape of a stepped circular cylinder, which has a small-diameter port press-fit portion 65A at one end thereof and a small-diameter plunger-guide portion 65B at the other end thereof. The guide member 65 further has a large-diameter portion 65C in the middle thereof. The port press-fit portion 65A is inserted into the cylindrical portion 41C of the pilot body 41 with a gap therebetween. The plunger-guide portion 65B is inserted through the opening 43B of the solenoid case 43 to project into the other end portion of the solenoid case 43. The large-diameter portion 65C is fitted in the recess 43C of the solenoid case 43. Further, the large-diameter portion 65C abuts against the cylindrical portion 41C of the pilot body 41 inserted and fitted in the recess 43C, thereby allowing the guide member 65 to be secured by being held between the pilot body 41 and the solenoid case 43.

The guide member 65A has a substantially circular cylindrical port member 67 press-fitted and secured in the port press-fit portion 65A. The port press-fit portion 65A has an annular retainer 66 attached to the distal end thereof. An O-ring 70 seals between the outer peripheral surface of the port member 67 and the inner peripheral surface of the cylindrical portion 41C of the pilot body 41. A passage 68 in the port member 67 communicates with the passage 41D in the pilot body 41.

The end portion of the port member 67 press-fitted into the guide member 65 has a port 36 formed by reducing the inner diameter of the passage 68. The port 36 opens into a valve chamber 73 formed in the guide member 65. The valve chamber 73 communicates with the chamber 25C in the casing 25 through an axial groove 74 formed in the port press-fit portion 65A of the guide member 65, an annular recess 69 formed on the inner peripheral edge of the opening of the port press-fit portion 65A, a radial passage 75 formed in the retainer 66, an annular gap 76 between the port press-fit portion 65A of the guide member 65 and the cylindrical portion 41C of the pilot body 41, and a passage 77 extending through the side wall of the cylindrical portion 41C. The passage 68 in the port member 67 communicates with the pilot chamber 34 through the passage 60 and further communicates with the interior of the passage member 42 through the fixed orifice 35 and the filter 61.

The guide member 65 has a plunger 78 inserted in the plunger-guide portion 65B thereof. The plunger 78 is axially slidably guided by the plunger-guide portion 65B. The plunger 78 has a tapered valve element 38 provided at the distal end thereof. The valve element 38 is inserted into the valve chamber 73 in the guide member 65 to selectively open and close the port 36 by unseating from and seating on a seat portion 36A at the end of the port member 67. The plunger 78 has a large-diameter armature 79 provided at the proximal end thereof. The armature 79 is disposed outside the plunger-guide portion 65B. The plunger-guide portion 65B has a substantially bottomed circular cylindrical cover 80 attached thereto to cover the armature 79. The cover 80 guides the armature 79 axially movably.

In the solenoid case 43, a solenoid 37 is disposed around the plunger-guide portion 65B projecting from the intermediate wall 43A and around the cover 80 attached to the plunger-guide portion 65B. The solenoid 37 is secured to the solenoid case 43 by a closing member 81 attached to the opening portion of the solenoid case 43. A lead wire (not shown) connected to the solenoid 37 is extended to the outside through a notch 81A formed on the closing member 81. The plunger 78 is urged by the spring force of a return spring 84 provided between the plunger 78 and the port member 67 in a valve-opening direction in which the valve element 38 separates from the seat portion 36A to open the port 36. When the solenoid 37 is energized, the plunger 78 is thrusted to move against the spring force of the return spring 84 in a valve-closing direction in which the valve element 38 seats on the seat portion 36A to close the port 36.

The following is an explanation of the operation of the damping force control type shock absorber 1 structured as stated above. The damping force control type shock absorber 1 is installed between sprung and unsprung members of a suspension system of a vehicle. The damping force control type shock absorber 1 operates according to commands from an in-vehicle controller or the like. In a normal operating state, the solenoid 37 is energized to thrust the plunger 78 so as to seat the valve element 38 on the seat portion 36A, thus executing pressure control with the pilot valve 29.

During the extension stroke of the piston rod 6, the movement of the piston 5 in the cylinder 2 closes the check valve 13 of the piston 5. Before the disk valve 14 opens, the fluid in the cylinder upper chamber 2A, which serves as an upstream chamber, is pressurized to pass through the passage 22 and the annular passage 21 and to flow into the passage member 42 of the damping force generating mechanism 26 from the connecting opening 23 of the separator tube 20.

At this time, an amount of hydraulic oil corresponding to the amount of movement of the piston 5 flows into the cylinder lower chamber 2B from the reservoir 4 by opening the check valve 17 of the base valve 10. It should be noted that, when the pressure in the cylinder upper chamber 2A reaches the valve-opening pressure of the disk valve 14 of the piston 5, the disk valve 14 opens to relieve the pressure in the cylinder upper chamber 2A into the cylinder lower chamber 2B, thereby preventing an excessive increase in pressure in the cylinder upper chamber 2A.

During the compression stroke of the piston rod 6, the movement of the piston 5 in the cylinder 2 opens the check valve 13 of the piston 5 and closes the check valve 17 for the passage 15 in the base valve 10. Before the disk valve 18 opens, the fluid in the cylinder lower chamber 2B flows into the cylinder upper chamber 2A, and an amount of fluid corresponding to the amount by which the piston rod 6 enters the cylinder 2 flows from the cylinder upper chamber 2A, which serves as an upstream chamber, into the reservoir 4 through a flow path similar to that during the above-described extension stroke. It should be noted that, when the pressure in the cylinder lower chamber 2B reaches the valve-opening pressure of the disk valve 18 of the base valve 10, the disk valve 18 opens to relieve the pressure in the cylinder lower chamber 2B into the reservoir 4, thereby preventing an excessive increase in pressure in the cylinder lower chamber 2B.

In the damping force generating mechanism 26, the hydraulic oil flowing in from the passage member 42 flows into the reservoir 4, which serves as a downstream chamber, mainly through the following three flow paths.

(1) Main Flow Path

The hydraulic oil flowing in from the passage member 42 passes through the passages 39A in the main body 39, opens the disk valve 30 of the main valve 27 to flow into the chamber 25C in the casing 25, and flows into the reservoir 4 through the passage grooves 25B and the opening 24.

(2) Control Flow Path

The hydraulic oil flowing into the passage member 42 passes through the insides of the retainer 62 and the spacer 63, which are provided in the cylindrical portion 41B of the pilot body 41, and through the notch 63A of the spacer 63, the passage 52 in the side wall of the cylindrical portion 41B, and the fixed orifice 32 to flow into the pilot chamber 31. From the pilot chamber 31, the hydraulic oil further passes through the passages 53 in the control body 40, opens the disk valve 33 of the control valve 28 to flow into the chamber 25C in the casing 25, and passes through the passage grooves 25B and the opening 24 to flow into the reservoir 4.

(3) Pilot Flow Path

The hydraulic oil flowing into the passage member 42 passes through the insides of the retainer 62 and the spacer 63, the filter 61, the fixed orifice 35, and the passage 41D, which are provided in the cylindrical portion 41B of the pilot body 41. The hydraulic oil further passes through the passage 68 and port 36 in the port member 67 and opens the valve element 38 of the pilot valve 29 to flow into the valve chamber 73. Further, the hydraulic oil passes through the axial groove 74, the annular recess 69, the radial passage 75, the gap 76, and the passage 77 to flow into the chamber 25C in the casing 25 and further passes through the passage grooves 25B and the opening 24 to flow into the reservoir 4.

Thus, during both the extension and compression strokes of the piston rod 6, damping force is generated by the main valve 27, control valve 28 and pilot valve 29 of the damping force generating mechanism 26. At this time, the disk valve 30 of the main valve 27 opens upon receiving the pressure in the passages 39A. On the other hand, the pressure in the pilot chamber 31, which is provided at the back of the disk valve 30, acts on the disk valve 30 in the direction for closing the disk valve 30. That is, the disk valve 30 opens according to the differential pressure between the pressure in the passages 39A and that in the pilot chamber 31. Therefore, the valve-opening pressure of the disk valve 30 varies according to the pressure in the pilot chamber 31. When the pressure in the pilot chamber 31 is low, the valve-opening pressure is low; when the pressure in the pilot chamber 31 is high, the valve-opening pressure is high.

The disk valve 33 of the control valve 28 opens upon receiving the pressure in the passages 53. On the other hand, the pressure in the pilot chamber 34, which is provided at the back of the disk valve 33, acts on the disk valve 33 in the direction for closing the disk valve 33. That is, the disk valve 33 opens according to the differential pressure between the pressure in the passages 53 and that in the pilot chamber 34. Therefore, the valve-opening pressure of the disk valve 33 varies according to the pressure in the pilot chamber 34. When the pressure in the pilot chamber 34 is low, the valve-opening pressure is low; when the pressure in the pilot chamber 34 is high, the valve-opening pressure is high.

When the piston speed is in a low speed region, the main valve 27 and the control valve 28 are closed. The hydraulic oil flows into the reservoir 4 mainly through the above-described pilot flow path (3). Accordingly, a damping force is generated by the pilot valve 29. As the piston speed increases, the pressure on the upstream side of the pilot valve 29 increases. At this time, the pressures in the pilot chambers 31 and 34, which are upstream of the pilot valve 29, are controlled by the pilot valve 29. That is, when the pilot valve 29 opens, the pressures in the pilot chambers 31 and 34 reduce sequentially, as will be explained below.

Figure 4:
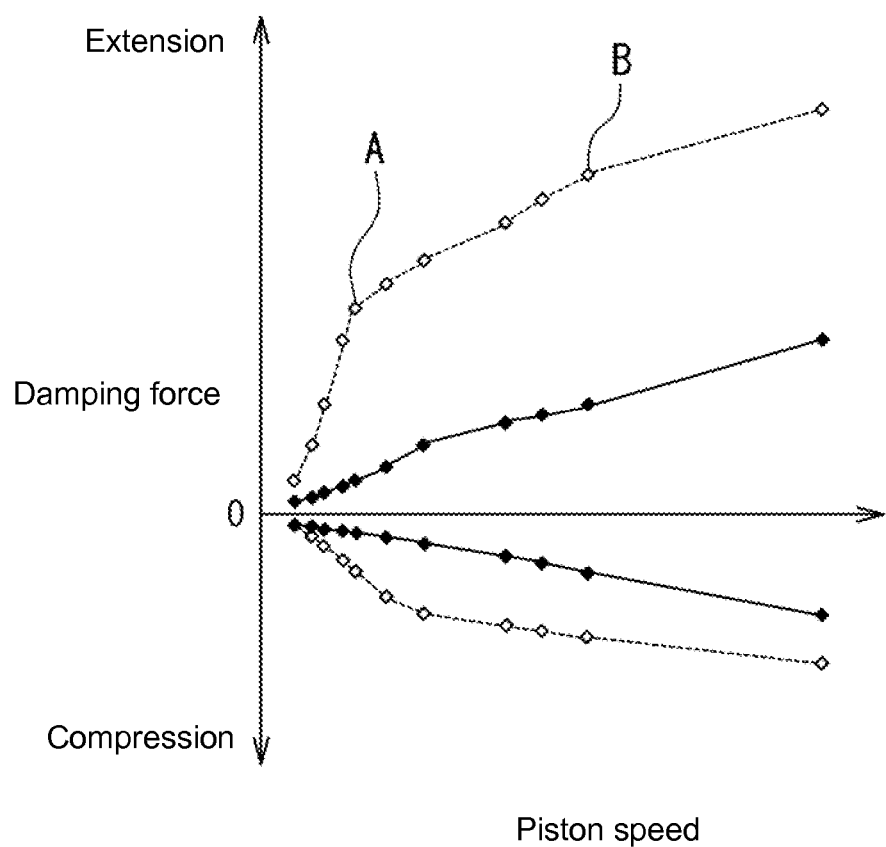
FIG. 4 is a graph showing damping force characteristics of the damping force control type shock absorber shown in FIG. 1.

When the pilot valve 29 opens, first, the disk valve 33 of the control valve 28 opens, and the hydraulic oil flows into the reservoir 4 through the above-described control flow path (2) in addition to the pilot flow path (3). Thus, the increase in damping force due to the increase in piston speed is suppressed (see point A in FIG. 4).

When the disk valve 33 of the control valve 28 opens, the pressure in the pilot chamber 31 reduces. As a result of the reduction in pressure in the pilot chamber 31, the disk valve 30 of the main valve 27 opens. Consequently, the hydraulic oil flows into the reservoir 4 through the above-described main flow path (1) in addition to the pilot flow path (3) and the control flow path (2). Thus, the increase in damping force due to the increase in piston speed is suppressed (see point B in FIG. 4).

Thus, the increase in damping force due to the increase in piston speed is suppressed in two steps, thereby allowing appropriate damping force characteristics to be obtained. In addition, it is possible to control the pressure in the pilot chamber 34 of the control valve 28, i.e. the valve-opening pressure of the disk valve 33, by adjusting the control pressure of the pilot valve 29 through energization of the solenoid 37. Further, it is possible to control the pressure in the pilot chamber 31 of the main valve 27, i.e. the valve-opening pressure of the disk valve 30, by controlling the valve-opening pressure of the disk valve 33.

Thus, in a piston speed region where the main valve 27 is closed, a sufficient flow rate of hydraulic oil can be obtained because the disk valve 33 of the control valve 28 opens in addition to the pilot valve 29. Accordingly, the flow rate through the pilot valve 29 (i.e. the flow path area of the port 36) can be reduced, and it becomes possible to reduce the size of the pilot valve 29 (solenoid valve) and to save power consumption in the solenoid 37. In addition, because the damping force can be adjusted in two steps by the main valve 27 and the control valve 28, it is possible to increase the degree of freedom for adjusting damping force characteristics and hence possible to obtain appropriate damping force characteristics.

Next, a second embodiment of the present invention will be explained with reference to FIGS. 5 and 7. It should be noted that, in the following explanation, members or portions similar to those of the foregoing first embodiment are denoted by the same reference numerals as in the first embodiment, and that only the points in which the second embodiment differs from the first embodiment will be explained in detail.

Figure 5:
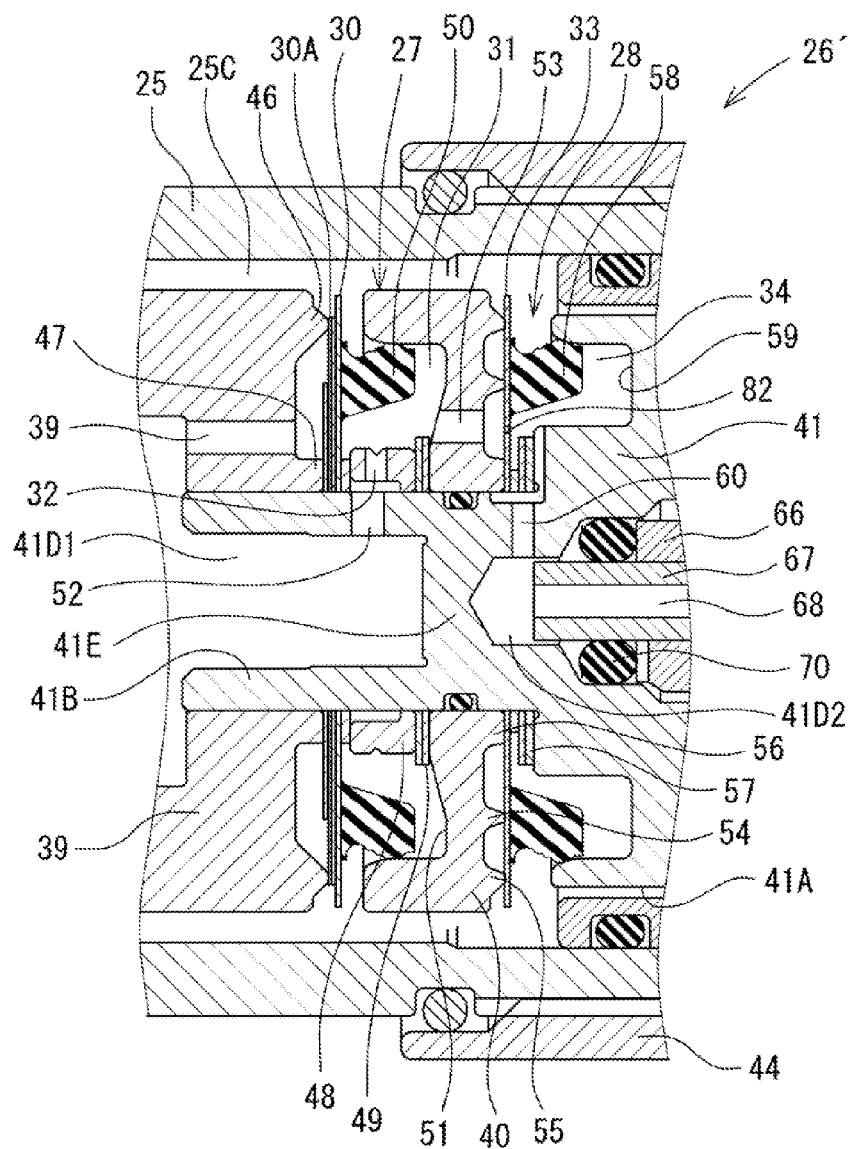
FIG. 5 is an enlarged vertical sectional view of an important part of a damping force control type shock absorber according to a second embodiment of the present invention.
Figure 7:
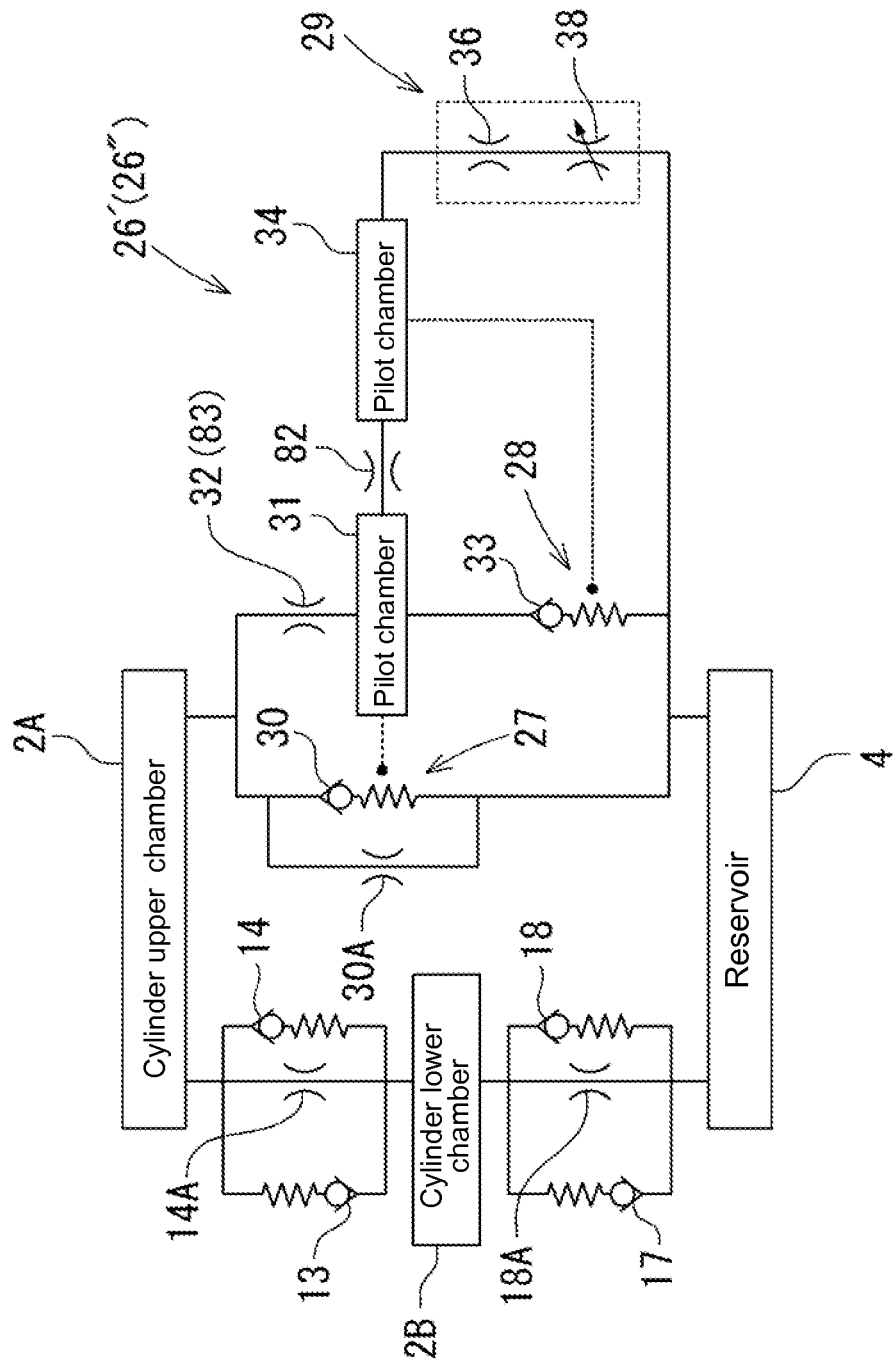
FIG. 7 is a hydraulic circuit diagram of the damping force control type shock absorber according to the second embodiment of the present invention.

As shown in FIGS. 5 and 7, a damping force generating mechanism 26' according to the second embodiment omits the fixed orifice 35, the filter 61, the retainer 62, and the spacer 63, which are provided in the pilot body 41 in the foregoing first embodiment. Instead, the pilot body 41 has an intermediate wall 41E formed in the cylindrical portion 41B thereof. The intermediate wall 41E divides the passage 41D in the cylindrical portion 41B into a portion 41D1 communicating with the passage 52 and a portion 41D2 communicating with the passage 60. In addition, the disk valve 33 of the control valve 28 is provided with a fixed orifice 82 constantly communicating between the passages 53 and the pilot chamber 34. The flow path area of the fixed orifice 82 is sufficiently smaller than that of the fixed orifice 32. FIG. 7 shows the hydraulic circuit of this embodiment.

Thus, in the above-described pilot flow path (3), the hydraulic oil flowing into the passage member 42 flows into the portion 41D1 in the cylindrical portion 41B of the pilot body 41 and passes through the passage 52 in the side wall of the cylindrical portion 41B and through the fixed orifice 32 in the retainer 48 to flow into the pilot chamber 31. From the pilot chamber 31, the hydraulic oil further passes through the passages 53 in the control body 40 and further through the fixed orifice 82 provided in the disk valve 33 of the control valve 28 to flow into the pilot chamber 34. From the pilot chamber 34, the hydraulic oil passes through the passage 60, the portion 41D2 in the cylindrical portion 41B, the passage 68 and port 36 in the port member 67 and opens the valve element 38 of the pilot valve 29 to flow into the valve chamber 73. Further, the hydraulic oil passes through the axial groove 74, the annular recess 69, the radial passage 75, the gap 76, and the passage 77 to flow into the chamber 25C in the casing 25 and further passes through the passage grooves 25B and the opening 24 to flow into the reservoir 4.

Consequently, the damping force can be adjusted in two steps by the main valve 27 and the control valve 28 in the same way as in the foregoing first embodiment, and it is possible to offer operational advantages similar to those of the first embodiment.

Figure 6:
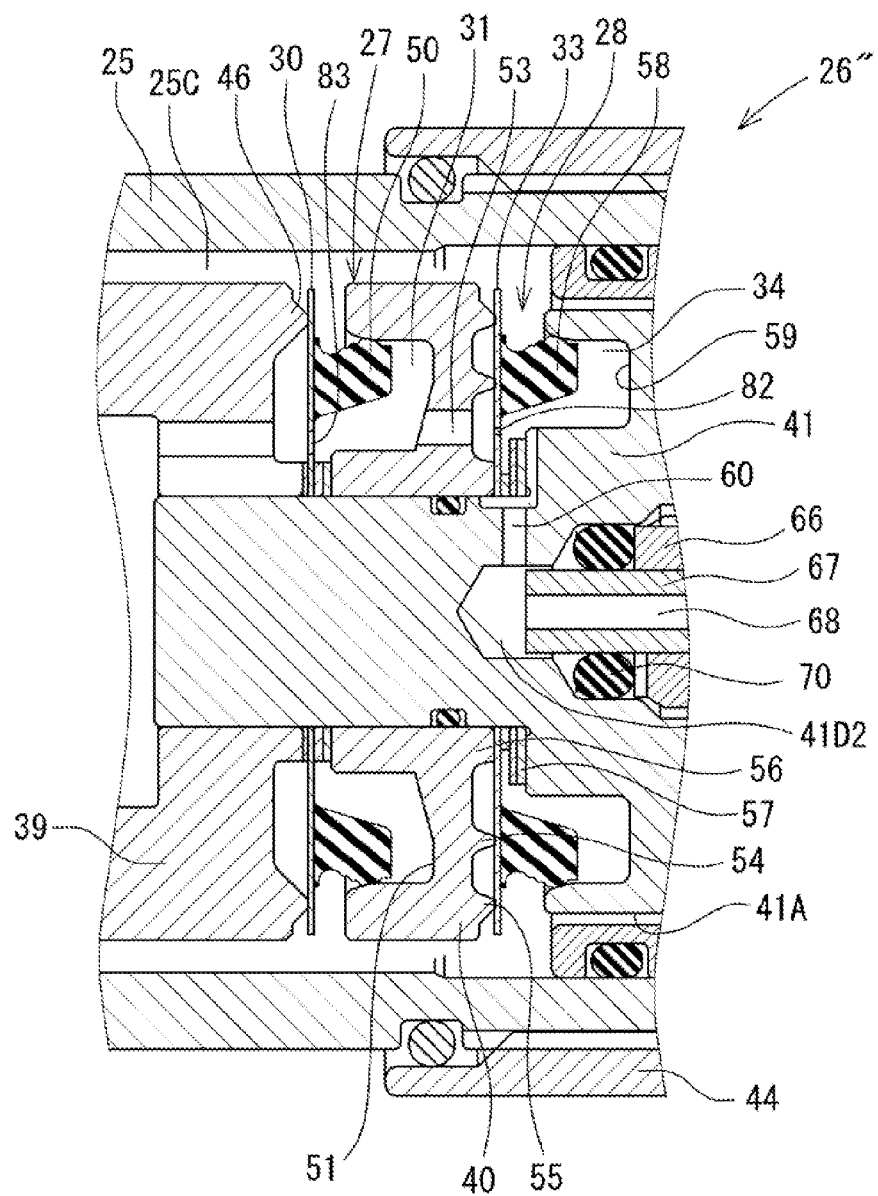
FIG. 6 is an enlarged vertical sectional view of an important part of a damping force generating mechanism in a modification of the damping force control type shock absorber according to the second embodiment of the present invention.

Next, a modification of the foregoing second embodiment will be explained with reference to FIG. 6. It should be noted that, in the following explanation, members or portions similar to those of the second embodiment, which is shown in FIGS. 5 and 7, are denoted by the same reference numerals as in the second embodiment, and that only the points in which the modification differs from the second embodiment will be explained in detail.

A damping force generating mechanism 26" according to the modification omits the passage 52 in the cylindrical portion 41B of the pilot body 41 and the fixed orifice 32 in the retainer 48. Instead, the disk valve 30 of the main valve 27 is provided with a fixed orifice 83 constantly communicating between the passages 39A and the pilot chamber 31. The flow path area of the fixed orifice 82 is sufficiently smaller than that of the fixed orifice 83. The hydraulic circuit of this modification is similar to that shown in FIG. 7.

Thus, in the above-described control flow path (2) and pilot flow path (3), the hydraulic oil flowing into the passage member 42 passes through the passages 39A in the main body 39 and further through the fixed orifice 83 provided in the disk valve 30 of the main valve 27 to flow into the pilot chamber 31. Thereafter, the hydraulic oil passes through the same flow path as in the foregoing second embodiment to flow into the reservoir 4. Consequently, it is possible to offer operational advantages similar to those of the second embodiment.

It should be noted that, in the foregoing first and second embodiments, the pilot valve 29 may be formed into a flow control valve of spool type or the like to adjust the flow rate of hydraulic oil flowing into the reservoir 4 to thereby generate a damping force and also to control the pressures in the pilot chambers 31 and 34 of the main and control valves 27 and 28.

Although in the foregoing first and second embodiments the damping force generating mechanism 26 is provided between the cylinder upper chamber 2A and the reservoir 4 by way of example, the present invention is not limited thereto. A compression damping force generating mechanism similar to the damping force generating mechanism 26 may be provided additionally between the cylinder 2B and the reservoir 4 to enable extension and compression damping forces to be controlled separately from each other. In this case, the piston assembly may omit the flow paths and may be provided with extension and compression relief valves. If a compression damping force generating mechanism is provided, the extension damping force generating mechanism 26 may be provided between the cylinder upper and lower chambers 2A and 2B.

Further, the present invention may be applied to a shock absorber in which a damping force generating mechanism is provided in the piston assembly, as disclosed, for example, in Japanese Patent Laid-Open Publication No. 2008-267489. The entire contents of Japanese Patent Laid-Open Publication No. 2008-267489 are herein incorporated by reference. In this case, a mechanism corresponding to the damping force generating mechanism 26 may be provided for each of the flow of hydraulic oil from the cylinder upper chamber 2A to the cylinder lower chamber 2B and the flow of hydraulic oil from the cylinder lower chamber 2B to the cylinder upper chamber 2A. In such a case, the present invention is also applicable to a mono-tube shock absorber.

Although the foregoing embodiments show a pilot-type valve comprising a disk valve 33 provided with an annular elastic seal member 58, which is made of an elastic material, e.g. rubber, the present invention is not limited thereto. Any valve that can control the pilot pressure may be used, e.g. a poppet type valve, besides a disk valve.

Next, a third embodiment of the present invention will be explained with reference to FIGS. 8 and 9. It should be noted that the third embodiment differs from the foregoing first embodiment in only a part of the structure. Therefore, an important part of the third embodiment is shown in FIG. 8, in which members or portions similar to those of the foregoing first embodiment are denoted by the same reference numerals as in the first embodiment, and only the points in which the third embodiment differs from the first embodiment will be explained in detail.

Figure 8:
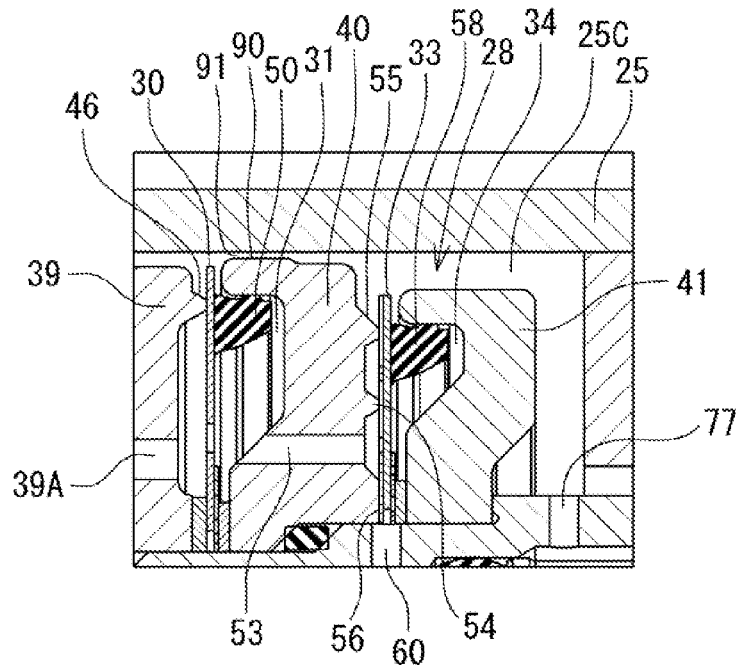
FIG. 8 is an enlarged vertical sectional view of an important part of a damping force generating mechanism of a damping force control type shock absorber according to a third embodiment of the present invention.

In a damping force control type shock absorber according to the third embodiment, as shown in FIG. 8, the control body 40 of the control valve 28 is provided with an annular inner seat portion 54 and an annular outer seat portion 55, and the disk valve 33 is seated on the inner and outer seat portions 54 and 55, in the same way as in the damping force control type shock absorber of the foregoing first embodiment. The passages 53 communicating with the pilot chamber 31 of the main valve 27 open at the inner peripheral side of the inner seat portion 54. The inner seat portion 54 and the outer seat portion 55 are disposed in concentric relation to each other and substantially equal in projection height to each other. Alternatively, the outer seat portion 55 is higher in projection height than the inner seat portion 54. By adjusting the projection height of the inner and outer seat portions 54 and 55 and the clamp portion 56, it is possible to vary the set load acting on the disk valve 33 when seated on the inner and outer seat portions 54 and 55, and hence possible to adjust the valve-opening characteristics of the disk valve 33.

It should be noted that the inner and outer seat portions 54 and 55 or the disk valve 33 may be provided with a notch appropriately to provide an orifice passage allowing a small amount of fluid to flow properly therethrough when the disk valve 33 is seated on the inner and outer seat portions 54 and 55.

The control body 40 has a large-diameter portion 90 formed on the outer periphery thereof. The large-diameter portion 90 defines an annular control valve orifice 91 (shown by the imaginary line in FIG. 3) narrowing the gap between the large-diameter portion 90 and the casing 25. The control valve orifice 91 restricts the flow of fluid from the passages 53 to the reservoir 4 when the disk valve 33 of the control valve 28 opens. The flow path area of the control valve orifice 91 is set so that the control valve orifice 91 does not restrict the flow (flow rate is low) of fluid from the pilot valve 29 to the reservoir 4. It should be noted that the flow of fluid from the main valve 27 to the reservoir 4 is not restricted by the control valve orifice 91.

The control valve orifice 91 is not limited to the above-described structure but may be structured as follows. The outer periphery of the control body 40 is abutted against the inner periphery of the casing 25 to divide the chamber 25C in the casing 25 into a main valve 27-side chamber and a control valve 28-side chamber, and the flow path between the two chambers is narrowed. The control valve orifice 91 may adopt other structures, provided that the control valve orifice 91 narrows the flow path from the passages 53 to the reservoir 4 when the control valve 28 opens, and does not restrict the flow of fluid from the pilot valve 29 to the reservoir 4.

The damping force control type shock absorber according to the third embodiment offers operational advantages similar to those of the first embodiment.

Further, because the inner and outer seat portions 54 and 55 are provided on the control valve 28, the disk valve 33 increases the degree of opening in order from the outer seat portion 55 toward the inner seat portion 54. Therefore, the expansion of the flow path can be optimized, and the valve-opening characteristics of the main valve 27 can be smoothed. By improving the valve-opening characteristics of the control valve 28 in this way, the pressure in the pilot chamber 31 (pilot pressure) can be optimized, and it becomes possible to effectively improve the damping force characteristics.

Figure 9:
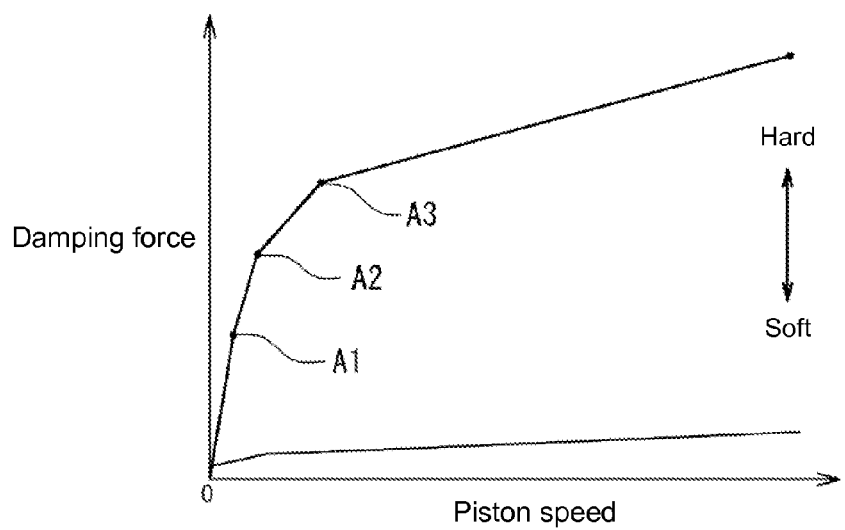
FIG. 9 is a graph showing damping force characteristics of the damping force control type shock absorber shown in FIG. 8.

FIG. 9 shows the damping force characteristics of the damping force control type shock absorber according to the third embodiment.

In FIG. 9, point A1 is where the pilot valve 29 opens. Point A2 is where the control valve 28 opens. Point A3 is where the main valve 27 opens. As a result of providing the inner seat portion 54 on the control valve 28, the connection between the valve-opening points A1, A2 and A3 of the pilot, control and main valves 29, 28 and 27 is improved, as shown in FIG. 9, and it is possible to obtain smooth damping force characteristics.

In addition, the control valve orifice 91 is provided to restrict the flow of fluid from the passages 53 to the reservoir 4 when the disk valve 33 of the control valve 28 opens, thereby suppressing an excessive increase in the degree of opening of the control valve 28. Thus, it is possible to suppress an excessive change in the pressure in the pilot chamber 31 of the main valve 27 and hence possible to obtain stable damping force characteristics.

As a fourth embodiment of the present invention, the foregoing third embodiment may be modified as follows. That is, an inner seat portion is provided inside the seat portion 46 of the main body 39 of the main valve 27, in the same way as the control valve 28, so that the passages 39A open at the inner peripheral side of the inner seat portion. With this structure, the disk valve 30 of the main valve 27 increases the degree of opening in order from the outer seat portion 46 toward the inner seat portion. Thus, the valve-opening characteristics become smooth.

Although the above-described third and fourth embodiments have been explained in relation to the foregoing first embodiment, it should be noted that the subject matters of the third and fourth embodiments are also applicable to the damping force control type shock absorber according to the above-described second embodiment.

With the damping force control type shock absorbers according to the foregoing embodiments, it is possible to reduce the size of the solenoid valve while maintaining a necessary damping force characteristic controllable range.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application Nos. 2013-114107 filed on May 30, 2013 and 2013-265788 filed on Dec. 24, 2013.

The entire disclosure of Japanese Patent Application Nos. 2013-114107 filed on May 30, 2013 and 2013-265788 filed on Dec. 24, 2013 including specification, claims, drawings and summary are incorporated herein by reference in its entirety.

What is claimed is:

1. A damping force control type shock absorber comprising:
   a cylinder having a hydraulic fluid sealed therein;
   a piston slidably fitted in the cylinder;
   a piston rod connected to the piston and extended to an outside of the cylinder; and
   a damping force generating mechanism adapted to generate a damping force by controlling a flow of hydraulic fluid caused by sliding movement of the piston in the cylinder;
   the damping force generating mechanism including:
   a pilot-type main valve that opens upon receiving a pressure of the hydraulic fluid to generate a damping force, the main valve having a pilot chamber into which the hydraulic fluid is introduced to adjust a valve-opening pressure of the main valve by a pressure in the pilot chamber;
   a pilot-type control valve adapted to control the pressure in the pilot chamber of the main valve; and
   a solenoid valve adapted to control a pressure in a pilot chamber of the control valve, wherein:
   the main valve generates a damping force by controlling a flow of hydraulic fluid from an upstream chamber to a downstream chamber caused by sliding movement of the piston;
   the control valve generates a damping force by controlling a flow of hydraulic fluid from the pilot chamber of the main valve to the downstream chamber;
   the solenoid valve generates a damping force by controlling a flow of hydraulic fluid from the pilot chamber of the control valve to the downstream chamber; and
   an area of a flow path through which the hydraulic fluid is introduced into the pilot chamber of the control valve is smaller than an area of flow path through which the hydraulic fluid is introduced into the pilot chamber of the main valve.

2. The damping force control type shock absorber of claim 1,
   wherein the control valve has a disk valve and a seat part on which the disk valve is seatable,
   the seat part includes an inner seat portion and an outer seat portion,
   the seat part of the control valve has a passage communicating with the pilot chamber of the main valve, and
   the passage opening at an inner peripheral side of the inner seat portion.

3. The damping force control type shock absorber of claim 2,
   wherein the main valve has a disk valve and a seat part on which the disk valve is seatable,
   the seat part includes an inner seat portion and an outer seat portion,
   the seat part of the main valve has a passage communicating with the upstream chamber, and
   the passage opens at an inner peripheral side of the inner seat portion.

4. The damping force control type shock absorber of claim 1,
   wherein the damping force generating mechanism further includes:
   a control valve orifice adapted to narrow a flow path from the control valve to the downstream chamber.

5. The damping force control type shock absorber of claim 1, wherein the solenoid valve is a pressure control valve.

6. The damping force control type shock absorber of claim 1, wherein the solenoid valve is a flow control valve.

7. A damping force control type shock absorber comprising:
   a cylinder having a hydraulic fluid sealed therein;
   a piston slidably fitted in the cylinder;
   a piston rod connected to the piston and extended to an outside of the cylinder; and
   a damping force generating mechanism adapted to generate a damping force by controlling a flow of hydraulic fluid caused by sliding movement of the piston in the cylinder;
   the damping force generating mechanism including:
   a pilot-type main valve that opens upon receiving a pressure of the hydraulic fluid to generate a damping force, the main valve having a pilot chamber into which the hydraulic fluid is introduced to adjust a valve-opening pressure of the main valve by a pressure in the pilot chamber;
   a pilot-type control valve adapted to control the pressure in the pilot chamber of the main valve; and
   a solenoid valve adapted to control a pressure in a pilot chamber of the control valve, wherein:
   the main valve generates a damping force by controlling a flow of hydraulic fluid from an upstream chamber to a downstream chamber caused by sliding movement of the piston;
   the control valve generates a damping force by controlling a flow of hydraulic fluid from the pilot chamber of the main valve to the downstream chamber;
   the solenoid valve generates a damping force by controlling a flow of hydraulic fluid from the pilot chamber of the control valve to the downstream chamber;
   the control valve has a disk valve and a seat part on which the disk valve is seatable;
   the seat part includes an inner seat portion and an outer seat portion;
   the seat part of the control valve has a passage communicating with the pilot chamber of the main valve; and
   the passage opens at an inner peripheral side of the inner seat portion.

8. The damping force control type shock absorber of claim 7,
   wherein the main valve has a disk valve and a seat part on which the disk valve is seatable,
   the seat part includes an inner seat portion and an outer seat portion, the seat part of the main valve has a passage communicating with the upstream chamber, and the passage opens at an inner peripheral side of the inner seat portion.

9. The damping force control type shock absorber of claim 8, wherein the inner seat portion and the outer seat portion are equal in projection height to each other.

10. The damping force control type shock absorber of claim 7, wherein the inner seat portion and the outer seat portion are equal in projection height to each other.

11. The damping force control type shock absorber of claim 7, wherein a projection height of the outer seat portion is higher than a projection height of the inner seat portion.

12. A damping force control type shock absorber comprising:
- a cylinder having a hydraulic fluid sealed therein;
- a piston slidably fitted in the cylinder;
- a piston rod connected to the piston and extended to an outside of the cylinder; and
- a damping force generating mechanism adapted to generate a damping force by controlling a flow of hydraulic fluid caused by sliding movement of the piston in the cylinder;

the damping force generating mechanism including:
- a pilot-type main valve that opens upon receiving a pressure of the hydraulic fluid to generate a damping force, the main valve having a pilot chamber into which the hydraulic fluid is introduced to adjust a valve-opening pressure of the main valve by a pressure in the pilot chamber;
- a pilot-type control valve adapted to control the pressure in the pilot chamber of the main valve; and
- a solenoid valve adapted to control a pressure in a pilot chamber of the control valve, wherein the main valve and the control valve are disk valves, the disk valves each comprising:
- a disk-shaped valve element; and
- an annular elastic seal member fixed to a rear side of the valve element, the elastic seal member being slidably and liquid-tightly fitted into a recess to form the pilot chamber.

* * * * *